United States Patent [19]

Grannis

[11] 4,030,854

[45] June 21, 1977

[54] UTILITY POLE DRILL GUIDE

[75] Inventor: Roland K. Grannis, San Mateo, Calif.

[73] Assignee: Pacific Utilities Supply Co., San Francisco, Calif.

[22] Filed: May 13, 1976

[21] Appl. No.: 686,130

[52] U.S. Cl. .............................. 408/115 B; 408/92
[51] Int. Cl.² ................... B23B 47/28; B23B 49/02
[58] Field of Search ................. 408/72 R, 72 B, 53, 408/88, 92, 100, 103, 104, 105, 106, 115, 115 B, 241 B; 144/92, 104; 427/327

[56] References Cited

UNITED STATES PATENTS

| 917,488 | 4/1909 | Roberts | 408/115 X |
|---|---|---|---|
| 2,029,650 | 2/1936 | Betz | 408/115 |
| 3,090,260 | 5/1963 | Brooks et al. | 408/92 |

Primary Examiner—Othell M. Simpson
Assistant Examiner—Z. R. Bilinsky
Attorney, Agent, or Firm—Julian Caplan

[57] ABSTRACT

A pair of metal longitudinal members (herein called "tubes") having spaced holes along their lengths are held in place lengthwise against a wooden utility pole by means of spring-tensioned chain tighteners. A plurality of V-shaped brackets are slideably connected at their ends across the tubes, the brackets having positioning pins in their ends for insertion into the holes of the tubes. Interchangeable bushings for different diameter drills are affixed to the V-shaped brackets. Preferably, a top support bracket having a pipe which fits on top of the pole is affixed across the upper ends of the tubes. The V-shaped brackets can be slid up and down the tubes so that holes can be drilled at precise distances from the top of the pole and from one hole to the next.

8 Claims, 4 Drawing Figures

UTILITY POLE DRILL GUIDE

THE INVENTION

This invention relates to a drill guide apparatus for use in drilling holes in conventional wooden utility poles. The holes are required to be at certain distances from the top of the pole and, as well, at certain distances apart from each other. There is increased usage of hardware and insulators "back-to-back" on poles and this requires accuracy in hole alignment. Such accuracy is achieved by this invention. Heretofore there have been various apparatus for drilling aligned holes in poles prior to their positioning; i.e., when the poles are in a horizontal position. There are also devices for mounting a drilling jig directly on a vertically positioned pole. None of such apparatus, whether for use with poles in place or in horizontal position, have provided an accurate and easily adjustable means for aligning the holes to be drilled and for guiding the drilling operation itself.

In the present invention, an adjustable drill guide assembly is provided having a pair of parallelly aligned tubes with a series of in-line spaced apart holes along their lengths, the tubes being held firmly in place against the pole by means of one or more spring-tensioned chain tighteners, with the chains running from one tube around the pole and hooking on to the second tube. A plurality of V-shaped brackets are slideably connected at their ends across the tubes with spring-loaded positioning pins housed in the ends of the V-shaped brackets and being insertable into the holes of the tubes. Interchangeable bushings for different diameter drills are affixed perpendicularly to the tubes on the V-shaped brackets. The positioning pins are provided with knobs so that they can be easily pulled out by hand for sliding the V-shaped brackets on the tubes. Preferably, a top support bracket is provided at the upper ends of the tubes, such bracket having a pipe support which fits over the top of the utility pole so that the V-shaped brackets below can be positioned on the tubes at any given distance from the top of the pole. Thus, the assembly provides an easily adjustable means for use in drilling holes at precise distances from the top of the pole and, as well, at distances from one hole to the next, so that when brackets are bolted to the pole they will be in proper alignment. The holes are parallel to each other so that the brackets on opposite sides of the pole will fit the bolt holes.

It is a further object of this invention to provide a drill guide assembly that can be easily extended by adding on to the parallel tubes so that more positioning holes are available for additional drill guides.

It is another object of the invention to provide a drill guide assembly having interchangeable bushings on moveable brackets such that different size holes can be drilled at precise distances from each other.

It is yet another object of this invention to provide a drill guide assembly which is held firmly in place during the drilling operation by means of lever-type spring-loaded chain tighteners.

Other objects of the present invention will become apparent upon reading the following specification and referring to the accompanying drawings in which similar characters of reference represent corresponding parts in each of the several views.

DESCRIPTION OF PREFERRED EMBODIMENT

Figure 2:
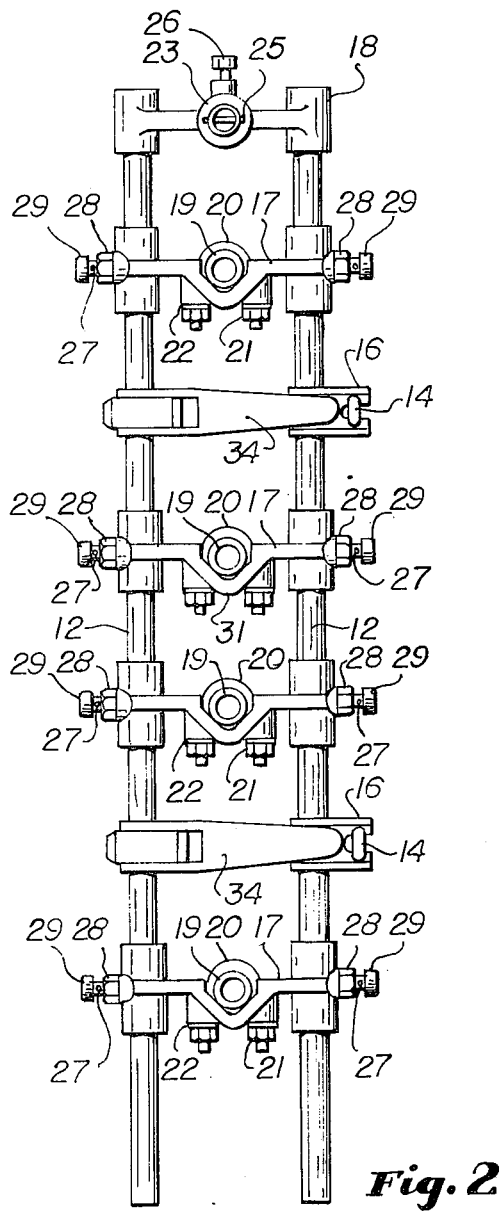
FIG. 2 is a front elevational view of the apparatus shown in FIG. 1.
Figure 1:
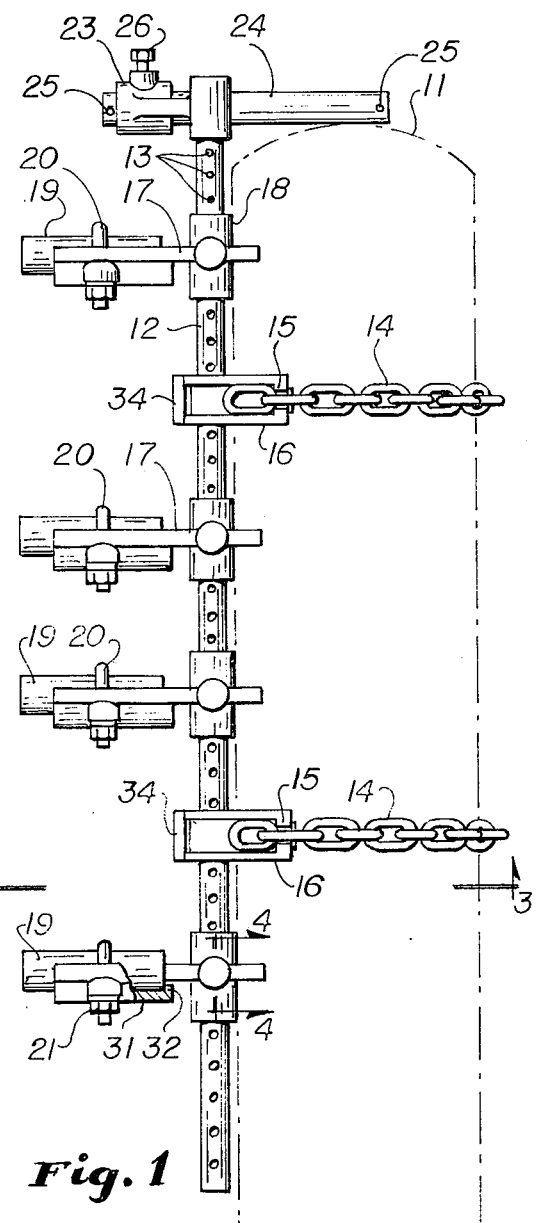
FIG. 1 is a schematic perspective view of the adjustable drill guide assembly of this invention shown in operative position of a wooden utility pole.

In FIG. 1, the adjustable drill guide assembly of this invention is shown in operative position on wooden utility pole 11. A pair of metal tubes 12 (as shown in FIG. 2) having a series of in-line spaced apart holes 13 are held firmly in position against the pole by chains 14 which run from one of the tubes 12 around the pole 11 to where they hook onto the hook portion 15 of the tightener bracket 16 on the opposite tube. Although two chain tighteners are shown in position, any given number may be used as long as the assembly is held firmly against the pole.

A plurality of V-shaped brackets 17 are slideably connected at their ends across the tubes 12 by bracket sleeves 18. Interchangeable drill guide bushings 19 are disposed perpendicularly to the tubes 12 by means of U-bolts 20 secured to V-shaped brackets 17 by nuts 21 and washers 22. Although four V-shaped brackets 17 are shown, more or less than such number may be employed in the drill guide assembly of this invention. That is, if additional holes need to be drilled in the pole, it will only be necessary to extend the tubes 12 downwardly on the pole and to attach additional V-shaped brackets 17.

As a preferred feature of the present invention, top support bracket 23 is provided with a slidable support pipe 24 which fits over the top of the utility pole. The slideable pipe 24 has roll pins 25 to keep it within the bracket 23 and a set screw 26 to hold it firmly at the desired length of extension. Use of top support bracket 23 allows for precise measurement of the distance from the top of the pole down to the first of the V-shaped brackets 17.

As shown in FIG. 2, the positioning pin 27 of the V-shaped bracket 17 is contained in housing 28. Each positioning pin 27 is equipped with a knob 29 so that the pins can be pulled out of the holes 13 of the tubes 12 for repositioning of the V-shaped brackets 17.

The metal tubes 12 are spaced apart about 8 inches to 10inches, and brackets 17 are at about 90° angles to accommodate a range of pole diameters. Similarly, the construction material of the tubes and brackets is not critical. The tubes may be made of tubular steel or aluminum alloy or any metal of sufficient strength to support the brackets.

Figure 3:
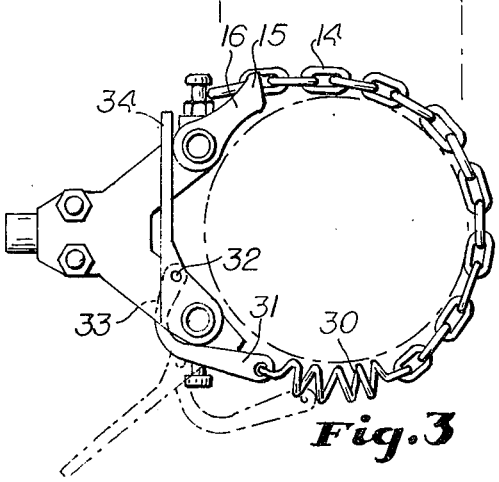
FIG. 3 is a view along line 3—3 of FIG. 1 showing the opened position of the chain tightener in dotted lines.

As shown in FIG. 3, the chain tightener is made up of chain 14 running from spring 30 around the utility pole to where it hooks to bracket 17. The spring 30 is connected to tensioning link 31 which pivots on roll pin 32 of latch 33. Thus, when latch handle 34 is pulled outwardly to rotate the latch 33 about the tube 12 to which it is attached, the tensioning link 31 pivots on roll pin 32 to allow the chain to be detached. Latch handle 34 thus rotates through an angle of about 180° to the position shown in the dotted lines.

Figure 4:
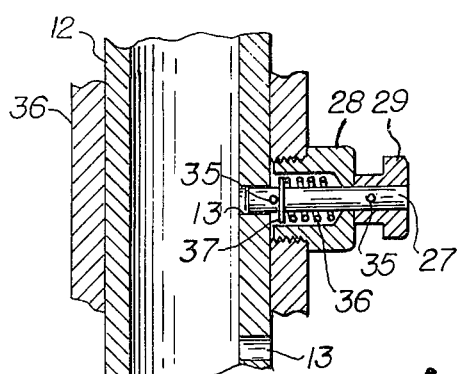
FIG. 4 is an elevational sectional view along line 4—4 showing the positioning pin and its housing.

As shown in FIG. 4, the positioning pin 27 contained in housing 28 has a knob 29, a spring 36 together with washer 37, and roll pins 35, such that when the knob is pulled out and the pin is drawn from the holes 13 of the tubes 12 to disengage the V-shaped bracket and allow such bracket to be slid up or down the tubes. The housing 28 is attached to the sleeve 38 of each V-shaped bracket 17. The positioning pins 27 can be easily pulled out of the holes 13 by hand for quick adjustment of each V-shaped bracket 17.

In a preferred form of the invention the bushings 19 slide in and out on V-cross-section supports 31 before being clamped tight by bolts 20. Lip 32 prevents 19 from moving so close to the pole that wood chips cannot be cleared.

Prior to installation on the pole, the distance from the top of the pole down to the first V-shaped bracket 17 can be readily ascertained using the top support bracket 23. The positioning pins 27 of the first V-shaped bracket can be disengaged from the holes in the tubes by pulling out the knobs, and the V-shaped bracket itself then slid upwards or downwards to the appropriate holes. Each following V-shaped bracket can be similarly positioned, until the entire assembly is arranged with the interchangeable bushings in exactly the desired positions.

In making use of the adjustable drill guide assembly of this invention, it is only necessary to lift the assembly into position against the wooden utility pole. The tightener chains are then drawn around the pole and hooked to the hook portion of the opposite bracket, and the latch handle is closed from its open (outward) position to tighten the chain around the pole.

I claim:

1. An adjustable drill guide assembly for use in drilling holes in wooden utility poles comprising a pair of parallelly aligned longitudinal members each having a series of longitudinally spaced apart holes, a plurality of V-shaped brackets slideably connected at their ends between the members, positioning pins located in the ends of the V-shaped brackets and disposable into the holes in the members, so that the V-shaped brackets can be spaced apart at a desired distance from one another along the members, holders disposed perpendicularly to the members on the V-shaped brackets, drill guide bushings fitting into the holders, and chain tightener means running from one member around the pole and attaching to the opposite member for holding the assembly on the pole.

2. The adjustable drill guide assembly of claim 1 additionally comprising an adjustable top support bracket having a slideable pipe which fits on top of the pole and allows spacing of the drill guide brackets below at a desired distance from the top of the pole.

3. The adjustable drill guide assembly of claim 1 in which said bushings are removable and interchangeable with different diameters.

4. The adjustable drill guide assembly of claim 1 wherein the chain tightener means comprises a latch having a handle and being pivotally secured to a first member, a tensioning linking pivotally secured to the latch near the latter's point of pivotal attachment to the first member, a spring secured to the free end of the tensioning link, a chain secured to the end of the spring and running around the pole, and a bracket affixed to the second member having a hook portion for attachment of the chain, whereby when the latch handle is drawn toward the second member, the tensioning link pivots on the latch to tighten the chain around the pole.

5. The adjustable drill guide assembly of claim 1 wherein the positioning pins are spring-loaded pins contained in housing and having knobs attached to their outer ends such that the pins can be pulled out of the holes in the members, the brackets repositioned, and the knobs released at the new location, with the springs urging the pins into the appropriate holes in the members.

6. The adjustable drill guide assembly of claim 1 wherein the holders for the interchangeable drill guide bushings comprise U-bolts which clamp over the bushings, with the bushings being held in channel portions of the V-shaped brackets.

7. An assembly according to claim 6 which further comprises a lip limiting movement toward the pole of said bushings in said brackets.

8. An adjustable drill guide assembly for use in drilling holes in wooden utility poles comprising a pair of parallelly aligned metal tubes spaced apart about 8 inches to 10 inches, each having a series of in-line, spaced apart holes along their outer sides, a plurality of V-shaped brackets slideably connected at their ends by bracket sleeves between the tubes in a plane perpendicular to that of the tubes, housings affixed to the sleeves of the V-shaped brackets, positioning pins having knobs at their outer ends and being slideably disposed in the housings perpendicularly to the tubes, springs contained in the housings for urging the pins into the holes in the tubes, drill guide bushings secured to the V-shaped brackets in channel portions thereof by U-bolts, at least two chains running from one tube around the pole to the opposite tube, each chain having a spring at one end, a latch having a handle and a tensioning link for attachment to each spring for tightening of the chain, and a top support bracket having a slideable pipe fitting over the top of the pole for measuring the distances from the top of the pole to the first V-shaped bracket.

* * * * *